US007260600B1

(12) United States Patent
Dunn et al.

(10) Patent No.: US 7,260,600 B1
(45) Date of Patent: Aug. 21, 2007

(54) USER SPECIFIED PARALLEL DATA FETCHING FOR OPTIMIZED WEB ACCESS

(75) Inventors: James M. Dunn, Fresno, CA (US); Bruce P. Semple, Potomac, MD (US); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 09/715,453

(22) Filed: Nov. 17, 2000

(51) Int. Cl.
*G06F 15/16* (2006.01)
(52) U.S. Cl. ...................... 709/203; 711/117
(58) Field of Classification Search ................ 709/217, 709/227, 229; 711/117–146
See application file for complete search history.

(56) References Cited

U.S. PATENT DOCUMENTS

| | | | | | |
|---|---|---|---|---|---|
| 5,899,995 | A | * | 5/1999 | Millier et al. ................ | 707/102 |
| 5,918,013 | A | * | 6/1999 | Mighdoll et al. ........... | 709/217 |
| 5,918,239 | A | | 6/1999 | Allen et al. ................. | 707/526 |
| 6,088,718 | A | * | 7/2000 | Altschuler et al. .......... | 709/203 |
| 6,119,135 | A | * | 9/2000 | Helfman ...................... | 715/513 |
| 6,185,659 | B1 | * | 2/2001 | Milillo et al. | |
| 6,189,000 | B1 | * | 2/2001 | Gwertzman et al. ........... | 707/1 |
| 6,199,071 | B1 | * | 3/2001 | Nielsen ....................... | 707/204 |
| 6,230,168 | B1 | * | 5/2001 | Unger et al. .............. | 715/501.1 |
| 6,385,699 | B1 | * | 5/2002 | Bozman et al. | |
| 6,407,680 | B1 | * | 6/2002 | Lai et al. | |
| 6,442,658 | B1 | * | 8/2002 | Hunt et al. | |
| 6,486,892 | B1 | * | 11/2002 | Stern .......................... | 345/760 |
| 6,516,462 | B1 | * | 2/2003 | Okunev et al. | |
| 6,553,468 | B1 | * | 4/2003 | Smith .......................... | 711/159 |
| 6,601,091 | B1 | * | 7/2003 | Spilo .......................... | 709/217 |
| 6,745,237 | B1 | * | 6/2004 | Garrity et al. .............. | 709/219 |
| 7,111,254 | B1 | * | 9/2006 | Rosen et al. ................ | 715/856 |
| 2001/0023395 | A1 | * | 9/2001 | Su | |
| 2002/0091760 | A1 | * | 7/2002 | Rozen | |

(Continued)

FOREIGN PATENT DOCUMENTS

EP  0 945 811  9/1999

(Continued)

OTHER PUBLICATIONS kee<p>oint, Oct. 27, 2000 Features.*

(Continued)

*Primary Examiner*—Bunjob Jaroenchonwanit
*Assistant Examiner*—Duyen Doan
(74) *Attorney, Agent, or Firm*—Akerman Senterfitt (57) ABSTRACT

A hypermedia document display method can include presenting hypermedia content, the hypermedia content containing hyperlinks to additional hypermedia content; storing selected ones of the hyperlinks in a delayed viewing list; and, caching hypermedia content associated with the stored hyperlinks during the presenting step. The method can further include reconfiguring the stored hyperlinks to point to the cached hypermedia content. The presenting step can include displaying Web content in a Web browser. In that case, the Web content can contain hyperlinks to additional Web content. The presenting step also can include playing back multimedia content in a multimedia content player. Finally, the presenting step can include displaying audiovisual television content combined with hypermedia content in a television set.

23 Claims, 5 Drawing Sheets

U.S. PATENT DOCUMENTS

2002/0178232 A1* 11/2002 Ferguson .................... 709/217

FOREIGN PATENT DOCUMENTS

| EP | B1 0 957 438 | 11/1999 |
| EP | 000987639 A1 * | 3/2000 |
| EP | 1 046 997 | 10/2000 |
| WO | WO9856188 | 12/1998 |
| WO | WO 0055741 * | 2/2000 |
| WO | WO 0024195 | 4/2000 |

OTHER PUBLICATIONS

"SlipKnot Version 1.50 is now available", May 5, 1997.*

* cited by examiner

USER SPECIFIED PARALLEL DATA FETCHING FOR OPTIMIZED WEB ACCESS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of multimedia content transfer and access. More particularly, the invention relates to a method and apparatus for user-specified parallel content caching for optimized web access.

2. Description of the Related Art

Ubiquitous access to hypermedia content, for example Web content, is part of the common vision of a connected society. Today, many consumers have access to hypermedia content through client computers and an increasing number of people have access to hypermedia content through television (TV) sets. Additionally, Internet-enabled telephones and other Internet appliances can offer such access wirelessly. Each time a user accesses hypermedia content, the hypermedia content can be accompanied by a collection of distracting hyperlinks or hot-spots offering access to even more hypermedia content.

Many models of TV-based e-commerce envision that the consumer can be offered a hot-spot on the screen and can click on the hot-spot to initiate a commercial transaction. Similarly, it is envisioned that consumers can click on hot-spots to retrieve additional information regarding the subject matter of audiovisual content presented in the TV. Still, retrieving hypermedia content in the midst of viewing television content can disturb the flow of the audiovisual presentation and can cause the user to miss entire portions of the presentation. To further exacerbate the problem, the hot-spots included in the presentation may not be available at times other than during the presentation. A similar problem exists for Web access via a computer. Specifically, a user can view a Web page having therein many hyperlinks. The user has the choice of continuing to view the Web page, or replacing the Web page with hypermedia content associated with selected ones of the hotlinks. This can be illustrated by the following scenarios:

Scenario #1—Users Connected to the Internet Through TV-Adapted Set-Top Boxes

A user views a television program and notices an indication that a replica of the leading actress' dress can be purchased by clicking on the dress. However, the user does not want to disrupt the delivery of the current program stream. Yet, the user worries that the hyperlink may not remain available subsequent to the presentation of the program. Thus, the viewer either can buy the dress and miss the show, or watch the show and miss the opportunity to buy the dress. Similarly, later in the show, an indication is given that the lyrics for the program background music are available for viewing by clicking on another hot-spot. Again, the user wants to view the lyrics, but does not want to miss the show.

Scenario #2—Users Connected to the Internet Through Computers

An end user researches information on the Web. While viewing content "rich" in hyperlinks, the researcher is faced with the challenge of reading the information in an orderly, methodical fashion, following the thought process of the author. However while reading the material the researcher will want to pursue a hyperlink cross-referencing some additional material, but only after reading the current content. In fact, over the course of reading the article, many hyperlinks may be identified as important. If the user follows the hyperlinks before reading all of the information, the user can become "lost" and unable to return to the point in the original article where the pursuit of a cross reference began.

SUMMARY OF THE INVENTION

A hypermedia document display method can include presenting hypermedia content, the hypermedia content containing hyperlinks to additional hypermedia content; storing selected ones of the hyperlinks in a delayed viewing list; and, caching hypermedia content associated with the stored hyperlinks during the presenting step. The method can further include reconfiguring the stored hyperlinks to point to the cached hypermedia content. The presenting step can include displaying Web content in a Web browser. In that case, the Web content can contain hyperlinks to additional Web content. The presenting step also can include playing back multimedia content in a multimedia content player. Finally, the presenting step can include displaying audiovisual television content combined with hypermedia content in a television set.

The caching step can include caching the hypermedia content in a server communicatively linked to the content browser. Alternatively, the caching step can include caching the hypermedia content in a local cache communicatively linked to the content browser. Notably, in one aspect of the present invention, the caching step can include evaluating available system resources; and, based upon the evaluation, downloading the hypermedia content associated with the stored hyperlinks to a hypermedia content cache when the system resources are available. Additionally, the caching step can include delaying the downloading when the system resources are constrained. Finally, the caching step can include evaluating available system resources; and, based upon the evaluation, caching the further hypermedia content in a proxy cache where downloading the further hypermedia content to a local cache can constrain local resources.

In another aspect of the present invention, the caching step can include configuring a page depth to which the hyperlinks in the hypermedia content associated with the stored hyperlinks can be followed; downloading the hypermedia content associated with the stored hyperlinks, the downloaded hypermedia content containing additional hyperlinks to further hypermedia documents; further downloading the further hypermedia documents, the further hypermedia documents containing further hyperlinks to even further hypermedia documents; and, repeating the further downloading step until reaching the configured page depth.

The method of the invention also can include reconfiguring the stored, further and additional hyperlinks to point to associated hypermedia documents stored in the cache. Moreover, to facilitate the organization of the cached hypermedia content, the caching step can further include establishing a set of folders having an associated topic; and, downloading the hypermedia content to selected ones of the set of folders, each folder in the set containing hypermedia content corresponding to a topic associated with the folder. Finally, to facilitate searching the cached hypermedia content, the method can include adapting the cached hypermedia content for full text searching in a full text search engine.

In one aspect of the present invention, the storing step can further include associating expiration data with each hyperlink in the delayed viewing list; and, purging hyperlinks from the delayed viewing list based on the expiration data. Additionally, the method can further include purging cached hypermedia content associated with the purged hyperlinks. Significantly, the method can include manually managing selected hyperlinks in the delayed viewing list. Alternatively, the method can include automatically purging selected hyperlinks in the delayed viewing list. Notably, the method can include selecting hyperlinks in the delayed viewing list; and, presenting cached hypermedia content associated with the selected hyperlinks. Moreover, the method can also include selecting hyperlinks in the delayed viewing list; and, adding the selected hyperlinks to a list of bookmarks in the content browser.

The method can further include manually managing the cached hypermedia content. Finally, the caching step can include determining if a selected hyperlink is associated with hypermedia content having a limited lifetime; and, if it is determined that a selected hyperlink is associated with hypermedia content having a limited lifetime, identifying further hypermedia content necessary for viewing the hypermedia content having a limited lifetime, and downloading the hypermedia content having a limited lifetime and the necessary further hypermedia content.

A hypermedia document display system in accordance with the inventive arrangements can include a content browser for presenting hypermedia content to a user; a content cache for storing further hypermedia content related to the hypermedia content presented in the content browser; a delayed viewing list for storing hyperlinks to the further hypermedia content in the content cache, the hyperlinks contained in the hypermedia content presented in the content browser; and, a delayed viewing list manager. The delayed viewing list manager can download the further hypermedia content to the content cache during the presentation of the hypermedia content in the content browser. Also, the delayed viewing list manager can add hyperlinks associated with the further hypermedia content to the delayed viewing list.

In one aspect of the inventive system, the content browser can be a Web browser and the hypermedia content is Web content. Notably, the content cache can be a local cache associated with the content browser. Alternatively, the content cache can be a proxy cache communicatively linked to the content browser. Significantly, the delayed viewing list manager can further include a resource sensitive downloading agent. The resource sensitive downloading agent can monitor available system resources and can download the further hypermedia content to the content cache when system resources are available. Otherwise, the resource sensitive downloading agent can delay the downloading when the system resources are constrained.

A hypermedia content presentation system configured for operation in a cable system can include a set-top box connecting a television set to the cable system. The set-top box can be adapted to present through the television set both television content originating in the cable system and hypermedia content originating in data servers in a data communications network. The system also can include a gateway server for providing an interface between the data communications network and the cable system; a delayed viewing list in the set-top box for storing selected hyperlinks in the hypermedia content to further hypermedia content in the data communications network; at least one cache for storing the further hypermedia content associated with the hyperlinks in the delayed viewing list; and, a delayed viewing list manager for downloading the further hypermedia content during the presentation of the hypermedia content through the television set by the set-top box.

Notably, the content cache can be a local cache associated with the set-top box. Additionally, the content cache can be a proxy cache associated with the gateway server. Significantly, the delayed viewing list manager can include a resource sensitive downloading agent wherein the resource sensitive downloading agent can monitor available system resources. The resource sensitive downloading agent can download the further hypermedia content to the content cache when system resources are available. Conversely, the resource sensitive downloading agent can delay the downloading when the system resources are constrained. Also, the resource sensitive downloading agent can cache the further hypermedia content in a proxy cache where downloading the further hypermedia content to a local cache can constrain local resources.

The present invention can be incorporated into a business method for providing fee-based content caching. This business method can include receiving requests from an end user to store in a delayed viewing list (DVL) selected ones of hyperlinks contained in hypermedia content presented in a client-side content browser; responsive to the end user requests, storing the selected hyperlinks in the DVL and notifying a third-party content caching system; responsive to the notification, caching in the third-party content caching system further hypermedia content associated with the stored hyperlinks, the caching occurring during the presentation of the hypermedia content in the client-side content browser; and, charging the end-user a fee for the content caching. Additionally, the method can include transmitting to the end user for presentation in the client-side content browser, selected ones of the cached hypermedia content.

The fee can be based upon how many bytes of data are included in the cached hypermedia content. Alternatively, the fee can be based upon how many times the end user caches hypermedia content. Notably, the hypermedia content can be Web content. In that case, the fee can be based upon how many Web pages are cached in the third party content caching system.

DETAILED DESCRIPTION OF THE INVENTION

Overview:

The present invention is a hypermedia content presentation method that can include presenting hypermedia content through a content browser wherein the hypermedia content contains hyperlinks to additional hypermedia content. Selected ones of the hyperlinks can be stored in a delayed viewing list (DVL). Finally, hypermedia content associated with the stored hyperlinks can be cached during the presenting step. Additionally, the stored hyperlinks can be reconfigured to point to the cached hypermedia content.

In accordance with the method of the invention, a user during a content browsing session can identify hyperlinks in hypermedia content presented in a content browser. The hyperlinks can point to hypermedia content which the user would like to browse at a later time. Notably, the hypermedia content to which the hyperlinks point can be cached for later browsing without relinquishing the view currently presented in the content browser. Furthermore, the desired hypermedia content can be downloaded during the content browser activity so that when the user decides to browse the cached hypermedia content, download delays can be avoided.

Figure 1A:
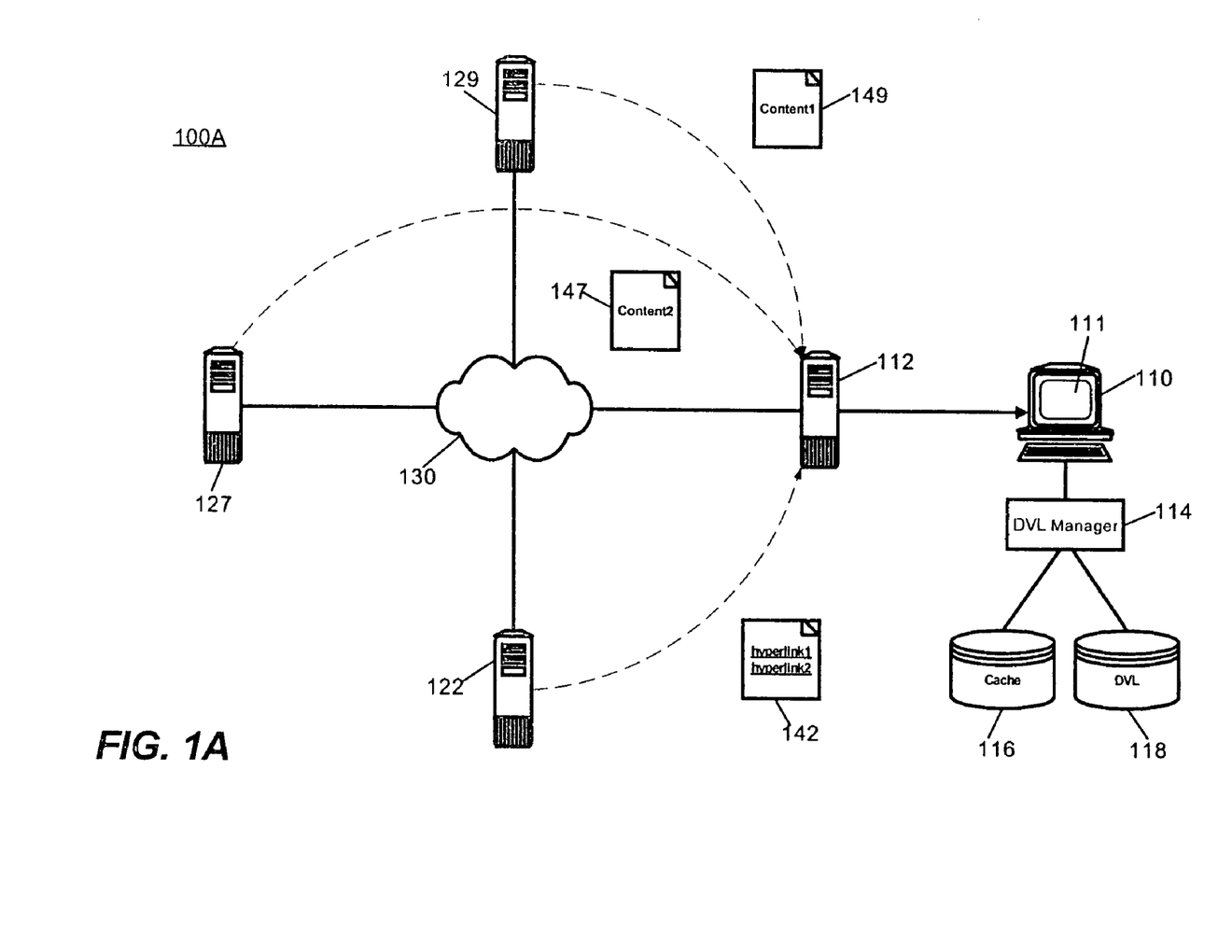
FIG. 1A is a schematic diagram illustrating an exemplary hypermedia content presentation system suitable for use with the present invention.

Figures:

FIG. 1 is a schematic diagram illustrating a hypermedia content presentation system 100A configured in accordance with one aspect of the present invention. As shown in the diagram, the system 100A can include hypermedia content servers 122, 127, 129, although the invention is not limited to any particular number of content servers. Hypermedia content servers 122, 127, 129 can store therein hypermedia content 142, 147, 149. Hypermedia content 142, 147, 149 can include any data whose format can be specified according to markup contained therein. Examples of hypermedia content 142, 147, 149 can include SGML, HTML, VRML, XML, and WML formatted documents. As will be understood to one skilled in the art, where hypermedia content 142, 147, 149 is specified according to HTML, the hypermedia content 142, 147, 149 can be referred to as Web content which can be provided by a Web server and decoded and presented in a Web browser.

Notably, hypermedia content 142, 147, 149 can also include therein hyperlinks to resources for example graphics objects, multimedia objects and further hypermedia content. Similarly, hypermedia content 142, 147, 149 can include embedded graphics and multimedia objects, as well as program scripts, for example Javascripts for execution as Java applets, or Visual Basic scripts for interpretation by a Visual Basic interpreter. Finally, the hypermedia content 142, 147, 149 can be a multimedia stream of data with which hyperlinks can be associated. Specifically, hypermedia content 142, 147, 149 in this regard can include streaming video with superimposed hyperlinks, or "hot-spots".

As shown in FIG. 1, a hypermedia content server 122 can provide hypermedia content 142 on demand through network 130 to a requesting client 110 in which the hypermedia content 142 can be displayed in a hypermedia content browser 111. As will be apparent to one skilled in the art, in practice a user interacting with the content browser 111 can request the hypermedia content 142 by specifying to a proxy server 112 a URL associated with the hypermedia content 142. The proxy server 112, in turn, can retrieve the requested hypermedia content 142 through the network 130 from the hypermedia content server 122 specified by the URL.

When the proxy server 112 has received the requested hypermedia content 142 from the hypermedia content server 122, the proxy server 112 can communicate the requested hypermedia content 142 to the requesting client 110. The client 110, in turn, can present the requested hypermedia content 142 to the user in the content browser 111. By the term "present", the invention is not merely limited to displaying hypermedia content 142. Rather, where the hypermedia content 142 is multimedia content, the term "present" can mean audibly or visually presenting sounds or video, respectively.

As noted above, the hypermedia content 142 can be Web content distributed across the Internet. Accordingly, the content browser 111 can be a Web browser and the proxy server 112 can be a Web proxy server which can receive HTTP requests for Web content from the Web browser. Notably, as shown for exemplary purposes only, the hypermedia content 142 can contain therein hyperlinks which can refer to further hypermedia content 147, 149 stored in hypermedia content servers 127, 129. Where the hypermedia content 142 is Web content, the hyperlinks can refer to further Web pages, multimedia content, file resources, etc.

The content browser 111 can include any means for presenting hypermedia content to an end user. By presenting, both audio and visual presentations, either exclusively or in combination, are contemplated. Example content browsers can include conventional HTML browsers, XML browsers, MPEG players, VoiceXML browsers, etc. In operation, the content browser 111 can present to a user requested hypermedia content 142 as shown in FIG. 1A. The requested hypermedia content 142 can contain hyperlinks to further hypermedia documents including hypermedia documents 147, 149. The user can select particular hyperlinks for storage in a "delayed view" list (DVL) 118 in which hyperlinks to further hypermedia content 147, 149 can be stored. By storing the selected hyperlinks in the DVL 118, the hypermedia content 147, 149 referenced by the stored hyperlinks can be downloaded to cache 116. Notably, the hypermedia content 147, 149 not only can include further hypermedia content such as additional Web pages, but also hypermedia content 147, 149 can include graphical objects, multimedia objects, file resources, etc.

Significantly, when a hyperlink is added to the DVL 118, an agent acting separately from the content browser 111, for example the DVL Manager 114, can download the further hypermedia content 147, 149 to the cache 116. Although the cache 116 is shown as a component of the client computer 110, it should be recognized by one skilled in the art that the cache 116 can be located on any computer communicatively linked to the client computer 110. For instance, in an alternative aspect of the present invention, the cache 116 can be included in a server for example the proxy server 112.

Notably, the DVL manager 114 can retrieve the further hypermedia content 147, 149 in a manner consistent with the resources of the client computer 110, the proxy server 112 and the network resources which connect the client computer 110 to the proxy server 112. Examples of constrained resources can include limited available network communications bandwidth and limited communications bandwidth between a client and the network. Other examples of constrained resources can include insufficient available disk storage for storing downloaded further hypermedia content 147, 149. Notwithstanding, the term constrained resources is not limited by those examples discussed above. Rather, constrained resources can be any computing resources necessary to transmit data from a server to a client or vice versa.

The DVL manager 114 can delay downloading the further hypermedia content 147, 149 when resources are constrained. Moreover, the DVL manager 114 can consider the type of content presented in the content browser 111 when determining whether to delay the caching of the further hypermedia content 147, 149. For example, if bandwidth-hungry streaming media is presented in the content browser 111, the DVL Manager 114 can delay the caching of the further hypermedia content 147, 149 until the streaming of the media has completed. However, if a simple Web page is presented in the content browser 111, the DVL Manager 114 can cache the further hypermedia content 147 during the presentation of the simple Web page. Notably, in most cases where conventional Web pages are displayed in the content browser 111, the DVL Manager 114 can concurrently cache the further hypermedia documents 147, 149 as hyperlinks thereto are added to the DVL 118.

Figure 1B:
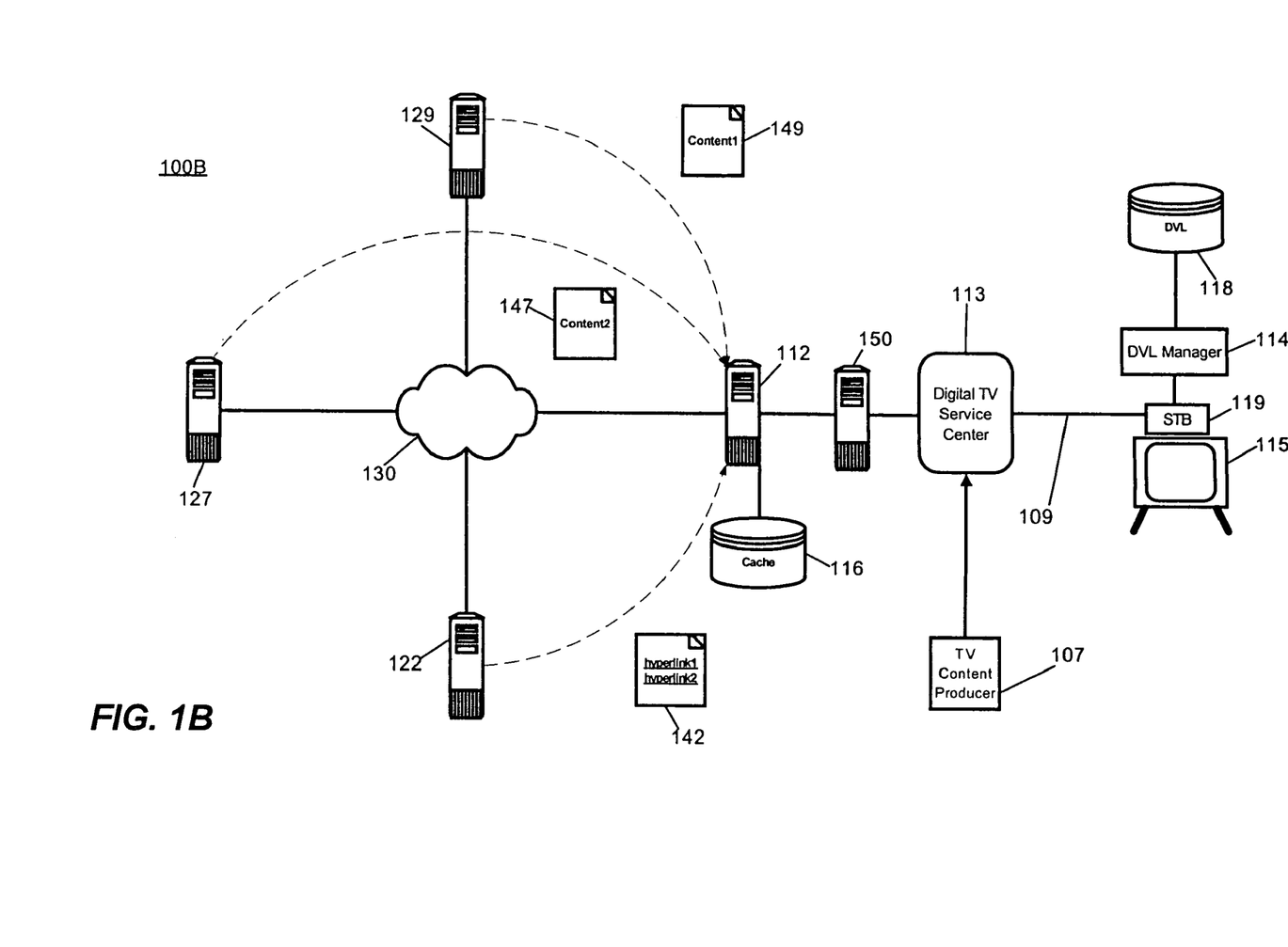
FIG. 1B is a schematic diagram illustrating an alternative exemplary hypermedia content presentation system suitable for use with the present invention.

While the system 100A of FIG. 1A illustrates the retrieval of hypermedia content 142, 147, 149 in a hypermedia content browser 111 in a client computer 110, the invention is not limited to a client computer 110. Rather, in another aspect of the present invention, hypermedia content 142, 147, 149 can be retrieved in a content browser in a set-top box (STB) configured to provide computer network access through a television (TV) set configured to communicate in a cable network. FIG. 1B is a schematic diagram illustrating such an alternative exemplary hypermedia content presentation system 100B.

As shown in FIG. 1B, hypermedia content 142, 147, 149 can be created by content providers, and may be specialized for TV presentation through specific TV authoring and transcoding tools. The hypermedia content 142 can be stored as in the case of FIG. 1A in data servers 122, 127, 129. However, unlike the case of FIG. 1A, in the case shown in FIG. 1B, the hypermedia content 142, 147, 149 can be provided to an end user not via a client computer 110, but via a TV 115 having a set-top box 119 connected to a cable system 109. More particularly, the cable system 109 can include a digital TV service center 113 in which TV content 107 can be combined with the hypermedia content 142, 147, 149 and transmitted to end users through the set-top boxes 119.

In this aspect of the invention, end users can interact with the hypermedia content 142, 147, 149 in a similar manner as in the case of FIG. 1A. Specifically, input device events, such as keyboard strokes and mouse clicks, can be transmitted on two way cable to the digital TV service center 113 in the cable system 109. The input device events can be extracted from the cable signal and passed to a gateway server 150 communicatively linked to data servers 122, 127, 129 in the data communications network 130. As in the case of FIG. 1A, the data servers 122, 127, 129 can be specific e-commerce servers positioned in the Internet. Notably, a server 112, for example a proxy server, can be positioned with or within the gateway server 150. Moreover, where the resources of the set-top box 119 are limited, the cache 116 can be included in the server 112.

Notably, the system 100B can include two caches: a cache 116 positioned with the server 112 and a local cache (not shown) positioned in the set-top box 119. By including two caches, specific cached hypermedia content can be stored locally in the local cache to support the scenario where a user intends to disconnect the set-top box 119 from the network 130, but continue to browse hypermedia content in the content browser 117. As a result, the user can "download" to the local cache desired hypermedia content for browsing at a later time when disconnected from the network 130. As in the case of FIG. 1A, the cache 116 of FIG. 1B can maintain the necessary user and hypermedia content 147, 149 information to enable a user in conjunction with the DVL Manager 114 to view hypermedia content 147, 149 previously identified by hyperlinks in the DVL 118. In particular, when a hyperlink is initially added to the DVL 118, the corresponding hypermedia content 147, 149 can be downloaded to the cache 116 so that subsequently, the cached hypermedia content 147, 149 can be combined with the TV content and provided to the TV 115 on user command.

Figure 2A:
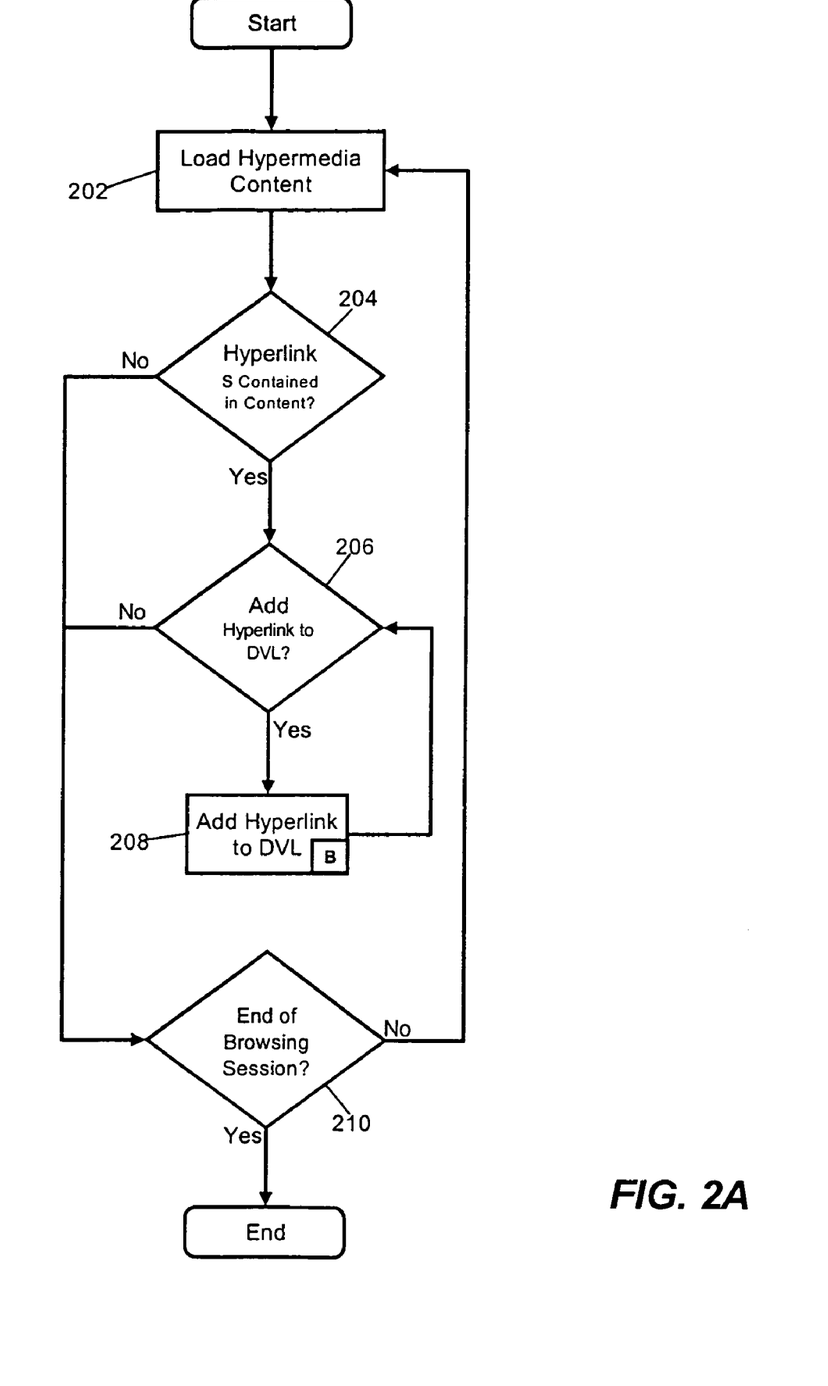
FIG. 2A is a flow chart illustrating a method for adding hyperlinks to a delayed viewing list in accordance with the inventive arrangements.
Figure 2B:
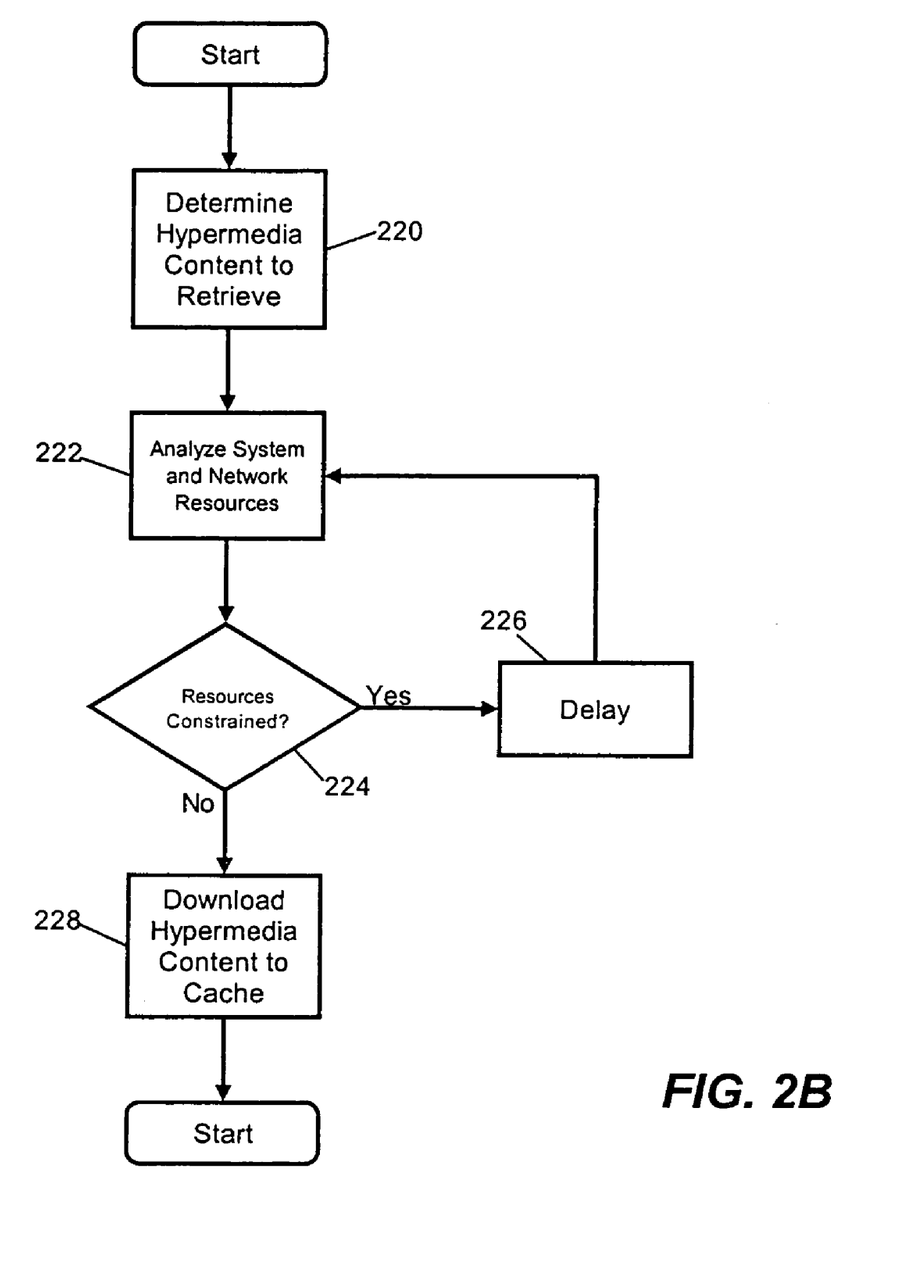
FIG. 2B is a flow chart illustrating a method for caching hypermedia content specified by hyperlinks in a delayed viewing list.

FIGS. 2A and 2B, taken together, illustrate a hypermedia content presentation method in which hypermedia content can be presented through a content browser, wherein the hypermedia content contains hyperlinks to additional hypermedia content. Selected ones of the hyperlinks can be stored in a DVL and hypermedia content associated with the stored hyperlinks can be cached during the presenting step. More particularly, beginning in step 202 of FIG. 2A, hypermedia content can be loaded in a content browser at the request of a user. Typically, the hypermedia content can be requested by specifying the location and name of the requested hypermedia content.

In decision step 204, it can be determined whether hyperlinks are contained in the hypermedia content presented in the content browser. If no hyperlinks are contained in the browser, the method branches to decision step 210 in which it can be determined if the hypermedia content browsing session shall continue. If the session continues, the method branches back to step 202. In step 204, if hyperlinks are contained in the hypermedia content, the method can await a user selection of one or more hyperlinks. The user can select hyperlinks using any conventional means. For instance, the user can right-click on a selected hyperlink thereby activating a floating menu. Subsequently, in step 208 the user can select a menu function for adding the hyperlink to the DVL. This process can repeat for each hyperlink to be added to the DVL. When no hyperlinks remain to be added to the DVL, in step 210 it can be determined if the hypermedia content browsing session shall continue. If the session continues, the method branches back to step 202 in which additional hypermedia content can be loaded.

Notably, in step 208, selected hyperlinks can be added to the DVL. In particular, when a hyperlink is added to the DVL as in step 208, a separate agent, for example a DVL Manager, not only can add the hyperlink to the DVL, but also can download to a cache the hypermedia content to which the hyperlink refers. Significantly, this caching step can occur separately albeit during the process illustrated in FIG. 1A. FIG. 1 more particularly illustrates a method for caching hypermedia content during the presentation of hypermedia content in FIG. 1A.

Beginning in step 220 of FIG. 2B, the DVL Manager can determine from the added hyperlink which hypermedia content to retrieve. Specifically, the hypermedia content specified by the hyperlink can be retrieved. Alternatively, not only can the hypermedia content specified by the hyperlink be retrieved, but also all hypermedia content referenced by the specified hypermedia content can be retrieved. Intermediately, the DVL Manager can be configured to retrieve hypermedia content referenced by the specified hypermedia content to a certain depth, for example a certain number of page levels.

Significantly, the DVL Manager can be a "background agent" communicatively linked to the DVL which can retrieve the associated hypermedia content as specified by corresponding hyperlinks and can store the same in a cache.

Notably, the DVL Manager can fetch and store the hypermedia content during the primary viewing of hypermedia content in the content browser. In consequence, the DVL Manager can be resource aware, for instance in terms of communications bandwidth, data storage and processor availability. As such, the DVL Manager can ensure that the caching of hypermedia content does not interfere with the primary task of presenting hypermedia content in the content browser. Hence, in step 222, the DVL manager can analyze system and network resources to determine in step 224 whether resources are constrained. In decision step 224, if resources are determined to be constrained, in step 226 the DVL Manager can delay caching the hypermedia content. Otherwise, if resources are not constrained, in step 228 the DVL Manager can download the hypermedia content to the cache.

For example if the user is viewing an MPEG file in an MPEG browser, the DVL Manager can detect the constrained bandwidth caused by the transmission of bandwidth consuming audiovisual content. As a result, the DVL Manager can delay caching further hypermedia content making the assumption that bandwidth is a constrained resource and that bandwidth need to be reserved for the MPEG browser. Subsequently, the DVL Manager can determine when the constrained resource is no longer required by the primary task of presenting the MPEG content. Then, the DVL Manager can download the further hypermedia content corresponding to hyperlinks added to the DVL by the user.

In order to use bandwidth optimally, the DVL Manager can include a function for packet prioritization and handling. A packet prioritization and handling function can allow foreground traffic (traffic associated with the content browser) to receive priority. If multiple content browsers are in use, the function can be supported by the operating system to provide the prioritization function. The packet prioritization and handling function can direct hypermedia content specified by hyperlinks in the DVL to the cache. As a result, when the user views the cached hypermedia content, the hypermedia content is available for immediate presentation.

Significantly, the DVL Manager can provide an interface to the content browser through which cached hypermedia content can be presented as if the cached hypermedia content were still residing in data servers associated with the hyperlinks stored in the DVL. More particularly, a user can view hyperlinks in the DVL and can load corresponding cached hypermedia content without requiring the content browser to retrieve the hypermedia content from a data server associated with the hyperlink. Rather, the DVL Manager will have already retrieved the hypermedia content during the original presentation of hypermedia content during which time the user had selected the hyperlink for addition to the DVL. When finished viewing cached hypermedia content, the user can choose to add the hyperlink to a set of bookmarks associated with the content browser.

Figure 3:
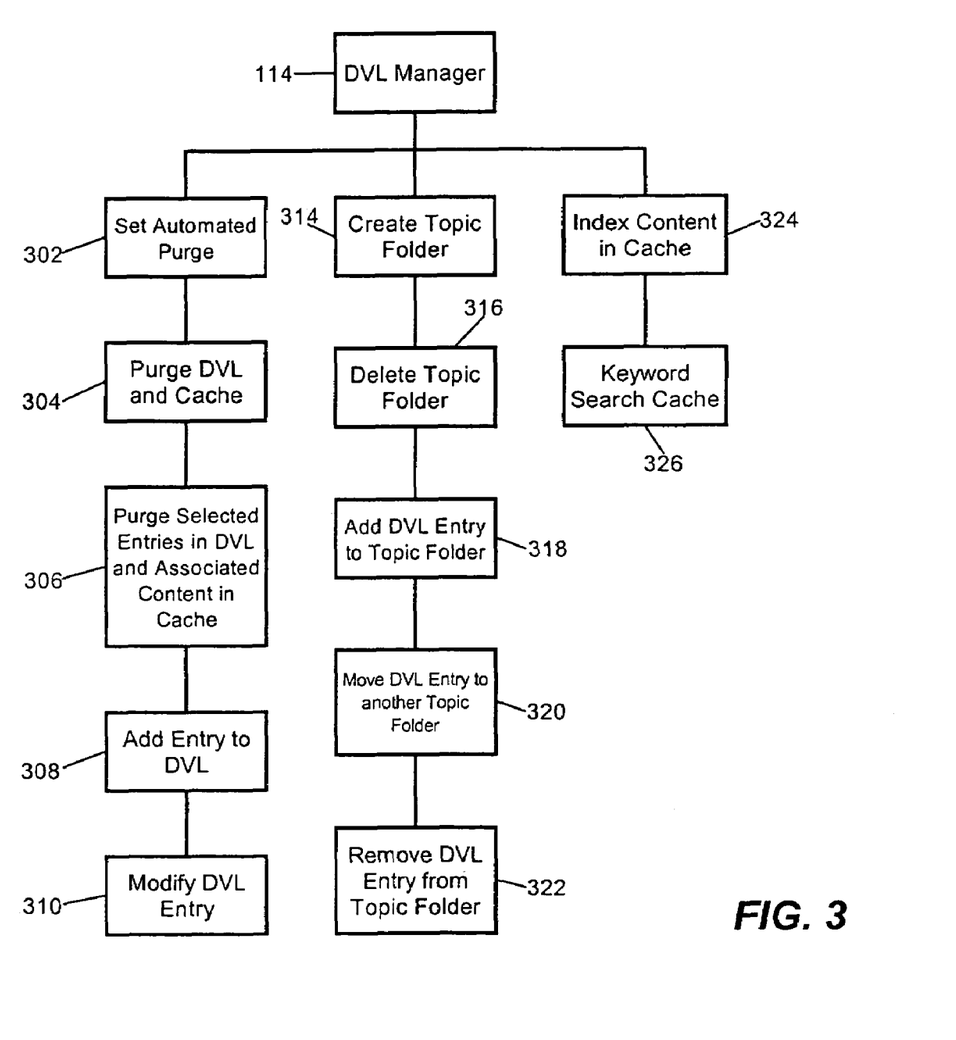
FIG. 3 is a block diagram illustrating functions performed by a delayed viewing list manager configured in accordance with the inventive arrangements.

Notably, in addition to caching hypermedia content corresponding to hyperlinks added to the DVL, the DVL Manager can provide management functions for managing both cached hypermedia content and hyperlinks stored in the DVL. FIG. 3 is a block diagram illustrating an exemplary function hierarchy for a DVL Manager 114. As shown in the figure, the DVL Manager can include functions for managing the DVL. Specifically, an automatic purge function 302 can cause an entry in the DVL to be purged when corresponding hypermedia content has been presented. In an alternative aspect of the invention, an automatic purge can be performed to eliminate stale content. Stale content can be identified, for example, by the age of the hyperlink which refers to the content. In another aspect of the invention, the entire DVL can be purged when the user disconnects the client device from the computer network or cable system as the case may be.

A manual purge function 304 can permit a user to manually purge not only all hyperlinks in the DVL, but also all hypermedia content in the cache. A selective purge function 306 can permit a user to selectively purge particular hyperlinks in the DVL and corresponding hypermedia content. An add function 308 can permit a user to add a hyperlink to the DVL. Finally, a modify function 310 can permit a user to modify an already existing entry in the DVL.

The DVL Manager 114 also can include a set of services which permit the user to logically organize cached hypermedia content. Specifically, cached hypermedia content can be organized into a series of topic folders. Accordingly, the DVL Manager 114 can include a create topic folder function 314 and a delete topic folder 316. Additionally, the DVL Manager 114 can include a function 318 for adding DVL entry to a topic folder, a function 320 for moving a DVL entry from one topic folder to another topic folder, and a function 322 for removing a DVL entry from a topic folder.

Finally, the DVL Manager 114 can include a facility for allowing the cached hypermedia content to be indexed with a full text search engine. In consequence, the user can search downloaded hypermedia content for specific keywords or concepts. Accordingly, the DVL Manager 114 can include a function 324 for indexing cached hypermedia content. Moreover, the DVL Manager 114 can include a keyword search function 326 for performing keyword searches on indexed hypermedia content stored in the cache.

Significantly, with particular regard to the support of set-top box applications, the DVL Manager can be configured to accommodate hyperlinks having a limited life-span. Examples of such hyperlinks can include, for example, hyperlinks which are validly selectable only while an associated advertisement is simultaneously presented in the content browser of the TV. If it is determined that a hyperlink has a limited life-span the DVL Manager, in conjunction with the server positioned with the gateway server, can be configured to both store enough of the simultaneously presented program stream and also cache any required hypermedia content to allow the hyperlink to be explored or activated at a later time subsequent to the expiration of the limited life-span. This function can be automatically provided or can require manual selection.

EXAMPLES

Example 1

The user is watching a television program on TV and sees an indication that a copy of the leading actress' dress can be purchased by clicking on the dress. Notably, in this case, the dress is a hypermedia hot spot which has a hyperlink to further hypermedia content. In particular, the further hypermedia content can be a Web page for conducting an e-commerce transaction—namely the purchase of the dress. The user can add the hyperlink to the DVL. The video stream of the television program remains uninterrupted. Subsequently, the user can be presented with further hyperlinks superimposed on the video stream which the user can selectably add to the DVL.

For each entry in the DVL, the DVL Manager can retrieve corresponding hypermedia content and store the same in a cache positioned in the gateway server providing the interface between the Internet and cable system. Alternatively, the DVL Manager can store the retrieved hypermedia content in a local cache in the set-top box. Subsequently, when the user is ready to review the cached hypermedia content, the user can select the hyperlink from the DVL and the corresponding cached hypermedia content is quickly available for viewing in the content browser.

Placement of the cache in the set-top box or the gateway server can depend on the availability of resources at either location and the availability of bandwidth. It is assumed that in a cable infrastructure, sufficient bandwidth exists so that data can be obtained and cached in parallel with a program stream without affecting the quality of the program stream. Further, it is assumed that an equal or greater amount of bandwidth is available between the gateway server and the data server acting as the hypermedia content source. Therefore, for networks with less bandwidth available in the last mile between the gateway server and the set-top box, caching materials at the gateway server may allow more efficient use of resource. When the client device lacks sufficient capability for storage or for running such applications, the gateway server is the best place for both content and control to reside.

Example 2

An end user can use a Web browser in a client computer to view content on the Web. In one Web page, several hyperlinks to other Web pages can exist. The user can select particular hyperlinks in the Web page which can be added to a DVL. During the user's browsing of subsequent Web content, the DVL Manager can download to the cache hypermedia content associated with the selected hyperlinks added to the cache. In this case, it is assumed that more capability is available in the client computer as compared to a set-top box. Therefore, it is more likely that the cache can reside in the client computer.

Still, it can be advantageous to have two caches-one in the server and the other in the client computer. More particularly, if the hypermedia content to be cached is large in size, for instance a video file, in order to optimize the bandwidth the hypermedia content can be downloaded to the cache in the server, for example a proxy server maintained by the ISP which provides Internet access to the end user. In contrast, if the hypermedia content is smaller in size, for instance a simple Web page, the hypermedia content can be downloaded to the cache in the client computer. Regardless, when the user has completed viewing the Web content, the user can recall the DVL and can select therefrom cached hypermedia content for viewing.

Example 3

A user can view TV content in a television connected to a set-top box in accordance with the inventive arrangements. During the viewing, the user can select hot-spots (hyperlinks embedded in or superimposed over a region of a video image) for addition to the DVL. When the viewing has completed, previously marked hot-spots can be presented, either by listing entries from the DVL, or by presenting the cached hypermedia content itself serially through the TV. Notably, by presenting the listed DVL entries or the cached hypermedia content automatically at the conclusion of the viewing, the viewer can be reminded of the entries in the DVL. Moreover, the viewer can be encouraged to access the hot-spots before the hot-spots "age-out" or are otherwise unavailable.

With a limited amount of storage for such hypermedia content in the cache, this presentation of the cached hypermedia content can promote timely use of the material before determinations are made as to which of the selected hot-spots can be preserved in the DVL for the user. This allows the viewer to view the data or complete the transaction, if it is an e-commerce transaction, and discard the hot-spot. If the user changes the TV channel, the previously marked hot-spots also can be presented over the TV. This provides a measure of time sensitivity to the cached hypermedia content and ensures that the hypermedia content will be viewed before relevant context is lost.

A further aspect of example 3 can include the addition of other, pertinent hypermedia content to that which has been cached. For example, if a national advertisement and a national hot-spot had been telecast, the review at DVL inspection time can include local, pertinent, information such as hours of operation, retail locations etc. This ability to modify and potentially add to the original information, based on a user's expression of interest, location, and other demographics supports a new business model. In this business model, the business entity supplying the additional material, and providing the cache can generate revenues from advertisers, viewers, local franchisees, etc.

Example 4

The present invention can be used in a business model in which a third party can provide fee-based DVL and content caching services to end users. In the business model of example 4, end users can register with a third party provider during which time the end user can agree to one or more particular fee arrangements. Such fee arrangements can include a flat fee for a specified quantity of cached content (including unlimited cached content), or fee-for-service in which case the user can be charged a fee for each instance of cached content. In this case, the fee amount can be based upon the cached content, for example upon each unit of storage used to store the cached. Each time the end user selects a hyperlink for inclusion in a DVL, the content can be cached and the user charged accordingly. Alternatively, the user can be charged upon viewing cached content.

To provide the functionality necessary for an end user to select hyperlinks and store the same in a DVL, a program can be provided to the end user, for example a content browser plug-in. The program can provide means for the end user to select a hyperlink and activate a menu which can contain menu options such as "Add to DVL". The program also can include functionality for adding selected hyperlinks to a DVL in response to an end user request to do the same. Finally, the program can include means for creating and managing a DVL, either locally by the client computing device of the end user or remotely in a computing device accessible by the third party provider.

We claim:

1. A hypermedia content presentation method comprising:
presenting hypermedia content on a local client system, said hypermedia content containing hyperlinks to additional hypermedia content;
responsive to a user selecting at least one of said hyperlink, storing user selected ones of said hyperlinks in a delayed viewing list;
analyzing data storage resources of the local client system and at least one of processing resources of the local client system and transmission bandwidth of a network connection between the local client system and a proxy server to determine if at least one resource-constrained condition for the local client system exists;

caching hypermedia content associated with said stored hyperlinks during said presenting step if no resource-constrained condition for the local client system exists, wherein the hypermedia content is presented to the user during said caching step;

delaying caching hypermedia content associated with said stored hyperlinks as long as at least one resource-constrained condition for the local client system exists;

organizing cached hypermedia content into a series of topic folders corresponding to different topics; and storing delayed viewing list entries in said series of topic folders, wherein each entry is stored in a topic folder containing associated hypermedia content.

2. The method of claim 1, further comprising reconfiguring said stored hyperlinks to point to said cached hypermedia content.

3. The method of claim 1, wherein said presenting step comprises displaying Web content in a Web browser, said Web content containing hyperlinks to additional Web content, said user selection being responsive to a right click mouse event on the selected hyperlink.

4. The method of claim 3, wherein said presenting step further comprises playing back multimedia content in a multimedia content player.

5. The method of claim 1, wherein said presenting step comprises displaying audiovisual television content combined with hypermedia content in a television set, said audio visual television content comprising a video stream, wherein said video stream is presented in an uninterrupted manner during said, storing, and caching steps.

6. The method of claim 1, wherein said caching step comprises caching hypermedia content in a server remotely located from and communicatively linked to said content browser.

7. The method of claim 1, wherein said caching step comprises caching hypermedia content in a local cache communicatively linked to said content browser and disposed within a client executing the content browser.

8. The method of claim 1, further comprising:

caching further hypermedia content in a proxy cache where downloading said further hypermedia content to a local cache can constrain at least one of data storage resources of the local system, processing resources of the local system, and transmission bandwidth of a network connection.

9. The method of claim 1, wherein said caching step comprises:

configuring a page depth to which said hyperlinks in said hypermedia content associated with said stored hyperlinks can be followed;

downloading said hypermedia content associated with said stored hyperlinks, said downloaded hypermedia content containing additional hyperlinks to further hypermedia documents;

further downloading said further hypermedia documents, said further hypermedia documents containing further hyperlinks to even further hypermedia documents; and, repeating said further downloading step until reaching said configured page depth.

10. The method of claim 9, further comprising reconfiguring said stored, further and additional hyperlinks to point to associated hypermedia documents stored in said cache.

11. The method of claim 1, further comprising adapting said cached hypermedia content for full text searching in a full text search engine.

12. The method of claim 1, wherein said storing step further comprises:

associating expiration data with each hyperlink in said delayed viewing list; and, automatically purging hyperlinks from said delayed viewing list based on said expiration data.

13. The method of claim 1, further comprising manually purging selected cached hypermedia content responsive to a user selection.

14. The method of claim 1, further comprising manually managing selected hyperlinks in said delayed viewing list via a user interface of a delayed viewing list manager.

15. The method of claim 1, further comprising automatically purging selected hyperlinks in said delayed viewing list responsive to the hypermedia content referenced by the selected hyperlinks being presented to a user.

16. The method of claim 1, further comprising:

selecting hyperlinks in said delayed viewing list; and, presenting cached hypermedia content associated with said selected hyperlinks.

17. The method of claim 1, further comprising:

selecting hyperlinks in said delayed viewing list; and, adding said selected hyperlinks to a list of bookmarks in a content browser.

18. The method of claim 1, further comprising manually managing said cached hypermedia content.

19. The method of claim 1, wherein said caching step comprises:

determining if a selected hyperlink is associated with hypermedia content having a limited lifetime; and, if it is determined that a selected hyperlink is associated with hypermedia content having a limited lifetime, identifying further hypermedia content necessary for viewing said hypermedia content having a limited lifetime, and downloading said hypermedia content having a limited lifetime and said necessary further hypermedia content.

20. A hypermedia content presentation system comprising:

a content browser executing on a local client system for presenting hypermedia content to a user;

a means for the user to select at least one hyperlink from within the content browser while the hypermedia content is displayed to the user;

a content cache for storing further hypermedia content related to said hypermedia content presented in said content browser;

a delayed viewing list for storing hyperlinks to said further hypermedia content in said content cache, said hyperlinks contained in said hypermedia content presented in said content browser, wherein said delayed viewing list is dynamically created responsive to user selections of hyperlinks that have been presented within the content browser; and, a delayed viewing list manager to analyze data storage resources of the local client system and at least one of processing resources of the local client system and transmission bandwidth of a network connection of between the local client system to determine if at least one resource-constrained condition for the local client system exists;

said delayed viewing list manager downloading said further hypermedia content to said content cache during said presentation of said hypermedia content in said content browser without a view currently presented in the content browser from being relinquished if no resource-constrained condition for the local client system exists;

said delayed viewing list manager delaying downloading said further hypermedia content to said content cache if least one resource-constrained condition for the local client system exists;

said delayed view list manager including a create-topic folder function for organizing cached hypermedia content into a series of topic folders corresponding to different topics;

said delayed view list manager further including an add function for adding delayed viewing list entries in said series of topic folder, wherein each entry is stored in a topic folder containing associated hypermedia content.

21. The hypermedia content presentation system of claim 20, wherein said content browser is a Web browser and said hypermedia content is Web content, said user selection being responsive to a right click mouse event on the selected hyperlink.

22. The hypermedia content presentation system of claim 20, wherein said content cache is a local cache associated with said content browser, and wherein said content browser is configured to display audiovisual television content combined with hypermedia content in a television set, said audio visual television content comprising a video stream, wherein said video stream is presented in an uninterrupted manner file operations relating to the content cache, the delayed viewing list, and the delayed viewing list manage are being performed.

23. The hypermedia content presentation system of claim 20, wherein said content cache is a proxy cache communicatively linked to said content browser.

* * * * *